United States Patent Office 3,766,284
Patented Oct. 16, 1973

3,766,284
3-ETHYLIDENETRICYCLO[4.2.1.0²·⁵]-NON-7-ENE
Antonio Carbonaro, Alberto Greco, Gino Dall'Asta, and Nazzareno Cameli, Milan, Italy, assignors to The B. F. Goodrich Company, New York, N.Y.
No Drawing. Original application Mar. 31, 1971, Ser. No. 129,972, now Patent No. 3,699,088, dated Oct. 17, 1972. Divided and this application Mar. 30, 1972, Ser. No. 239,807
Claims priority, application Italy, Apr. 9, 1970, 23,085/70
Int. Cl. C07c *13/00*
U.S. Cl. 260—666 PY    2 Claims

ABSTRACT OF THE DISCLOSURE 3-ethylidenetricyclo[4.2.1.0²·⁵]-non-7-ene is prepared by isomerizing 3-vinyltricyclo[4.2.1.0²·⁵]-non-7-ene. Copolymers of this monomer are prepared by polymerization with α-olefins with reduced metal catalysts. Elastomers are obtained from ethylene, propylene and 3-ethylidenetricyclo[4.2.1.0²·⁵]-non-7-ene. These polymers are sulfur-vulcanizable at an excellent rate and the resulting products have good mechanical properties.

---

This is a division, of application Ser. No. 129,972, filed Mar. 31, 1971, now U.S. Pat. 3,699,088, issued Oct. 17, 1972.

BACKGROUND OF THE INVENTION

The polymerization of α-olefins such as ethylene, propylene with non-conjugated dienes, particularly cyclic dienes, is known. Such cyclic dienes include, for example, dicyclopentadiene and 5-ethylidene-2-norbornene. Other cyclic non-conjugated dienes are desired to introduce unsaturation into α-olefin polymers and to obtain sulfur-vulcanized products having improved properties.

SUMMARY OF THE INVENTION 3-ethylidenetricyclo[4.2.1.0²·⁵]-non-7-ene of the formula

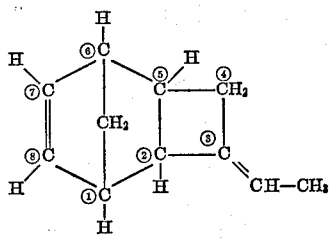

is a novel polycyclic non-conjugated diene that is readily copolymerized with α-olefins to provide sulfur-vulcanizable elastomers. Unsaturated polycyclic compounds are known but polycyclic compounds having unsaturation of the norbornene type and unsaturation of vinylidene type on a carbon atom on a cyclobutane ring are new. These polycyclic dienes are prepared by isomerizing, with a Group VIII metal catalyst, 3-vinyltricyclo[4.2.1.0²·⁵]-non-7-ene. 3-ethylidenetricyclo[4.2.1.0²·⁵]-non-7-ene is readily polymerized with α-olefins as ethylene and propylene in amounts of about 1 to 15% of the total mixture with reduced metal catalysts as vanadium to provide sulfur-vulcanizable elastomers having improved vulcanization rates and improved properties.

DETAILED DESCRIPTION

Compound I is readily obtained by an isomerization process. 3-vinyltricyclo[4.2.1.0²·⁵]-non-7-ene is brought into contact with a suitable isomerizing agent to form I. Among the isomerizing agents suitable for this purpose are those that are based on metals of the Group VIII, such as iron and cobalt.

As preferred examples of said catalysts are the systems which are obtained by placing in reaction an Fe or a Co compound with a trialkylaluminum. The molar ratio between the Al and the Fe or the Co compounds are usually selected from the range comprised between 3 and 10. As Fe or Co compounds one uses by preference those which are soluble in hydrocarbons such as chelates, carbonyls, etc. The trialkylaluminum compounds are represented by the general formula $AlR_3$, whereby R repersents an alkyl radical with a linear or a branched chain containing from 1 to 18 carbon atoms. The isomerization occurs at a satisfactory rate at temperatures of about 100–150° C.

Other efficient isomerization agents for the 3-vinyltricyclo[4.2.1.0²·⁵]-non-7-ene to 3 - ethylidenetricyclo[4.2.1.0²·⁵]-non-7-ene reaction are the iron carbonyls. For instance, $Fe(CO)_5$ is added to the unisomerized hydrocarbon in a ratio of 1 to 5 parts on 100 by weight and the reaction is effected in a liquid phase at a temperature selected in the range of 100–200° C.

The 3-ethylidenetricyclo[4.2.1.0²·⁵]-non - 7-ene is characterized by elementary analysis and by the volume (mass) spectrography to have the formula $C_{11}H_{14}$. It is a colorless liquid which in the infrared spectrum shows absorption bands at 710, 1320, 1460, 3030 cm.⁻¹ (characteristics of the norbornenic structure) and at 810 cm.⁻¹ (which are characteristic of the tri-substituted vinylidenic double bond). The nuclear magnetic resonance spectrum conforms to the formula and structure indicated.

The Compound I finds application in the production of copolymers and particularly in the production of polymers with α-olefins as ethylene and propylene or butene-1 which have elastomeric properties and are vulcanizable in sulfur-based recipes suitable for elastic rubbers used to advntage for selected end uses. The vulcanized products possess excellent mechanical characteristics and dynamic properties.

The process for the preparation of α-olefin polymers such as terpolymers of ethylene-propylene-3-ethylidenetricyclo[4.2.1.0²·⁵]-non-7-ene may be chosen from those well known in the art in which one obtains terpolymers from ethylene, propylene and non-conjugated dienes and usually are based on reduced metal or Ziegler catalysts. Preferred are the processes that employ catalytic systems of a vanadium compound which is soluble in hydrocarbons and an alkyl aluminum halide. Typical vanadium compounds are vanadium triacetylacetonate, vanadium tetrachloride, vanadyl trichloride. Alkyl aluminum halides apt to be employed are for instance: diethyl aluminum chloride, ethyl aluminum sesquichloride, and diisobutyl aluminum chloride. The molar ratio between the Al and the vanadium compounds is usually selected in the range between 5–100.

The reaction can be carried out in the presence of a diluent or hydrocarbon solvent, or in its absence, in the mixture of the monomers in a liquid state. The polymerization temperature preferred is in the range of −20 to +20° C.

The terpolymer ethylene-propylene - 3 - ethylidenetricyclo[4.2.1.0²·⁵]-non-7-ene so obtained is characterized by the presence in the spectrum of infrared absorption, of a band at about 11.8μ, and by the ability to be homogeneously vulcanized by employing recipes based on sulfur. The high vulcanization rate and the mechanical properties of the vulcanizate also characterize, in each compound, the new product according to this invention. Other known α-olefins and non-conjugated dienes may also be copolymerized to make sulfur-vulcanizable elastomers.

The following non-limiting examples serve the purpose of illustrating the characteristics of the new compounds obtained.

EXAMPLE I

Preparation of the 3-ethylidenetricyclo[4.2.1.0$^{2.5}$]-non-7-ene

In a glass phial containing dry nitrogen we place 5 cm.$^3$ of 3 - vinyltricyclo[4.2.1.0$^{2.5}$]-non-7-ene (prepared according to the method described in the Italian patent appln. No. 16,717A/69) and 0.2 cm.$^3$ of Fe(CO)$_5$ freshly distilled. The phial is flame-sealed and put in a thermostatted bath at 160° for 5 hours. Based on gas chromatographic analysis, the initial vinyl derivative has been isomerized by about 99%. The reaction product is isolated to a pure state by means of preparatory gas chromatography and shows the following properties: Boiling temperature 194° C. at 750 mm. Hg, $n_{20}{}^D$=1.5062. The infrared spectrum and the nuclear magnetic resonance spectrum confirm that by the isomerization of the 3-vinyltricyclo[4.2.1.0$^{2.5}$]-non-7-ene we have formed the 3-ethylidenetricyclo[4.2.1.0$^{2.5}$]-non-7-ene.

EXAMPLE II

Preparation of the 3-ethylidenetricyclo[4.2.1.0$^{2.5}$]-non-7-ene

In a 50 cm.$^3$ reflux glass flask there is charged in a nitrogen atmosphere 10 g. of 3-vinyltricyclo[4.2.1.0$^{2.5}$]-non-7-ene (prepared by the method described in Italian patent appln. No. 16,717A/69) to which there is added 280 mg. of Co bis(acetylacetonate) and 0.65 cm.$^3$ of Al(i-C$_3$H$_7$)$_3$. The solution so obtained is agitated by means of a small magnet raised to 160° and maintained at that temperature for 70 hours. The product is distilled in a vacuum in order to remove the catalyst. According to the chromatographic analysis the isomerization has occurred to the extent of 42%.

EXAMPLE III

Preparation of a terpolymer ethylene-propylene-3-ethylidenetricyclo[4.2.1.0$^{2.5}$]-non-7-ene The reaction apparatus consists of a 2 liter glass cylinder of 10 cm. diameter, equipped with an agitator, a thermometer and tubes for the admission and the exit of the gases. The inlet gas tube reaches to the bottom of the receptacle and ends in a sparger. There is charged into the apparatus which is kept at −20° C. by immersion in a thermostatic bath: 1000 cm.$^3$ of n-heptane, 0.1 millimol of diethyl zinc and 1.5 cm.$^3$ of 3-ethylidenetricyclo[4.2.1.0$^{2.5}$]-non-7-ene. Through the inlet gas tube there is added a mixture of propylene-ethylene in a molar ratio of 3:1 which is circulated at a speed of 600 Nl./h. (normal liters i.e. liters corrected to standard temperature-pressure). After 30 minutes of saturation there is added into the reactor 2.5 millimols of diethyl aluminum chloride and 0.05 millimol of triacetylacetonate of vanadium dissolved in 2 cm.$^3$ of toluene. During the test the propylene-ethylene mixture is fed and removed at a rate of 600 Nl./h. 20 minutes after the catalyst has been introduced the reaction is short-stopped by the addition of 10 cm.$^3$ of methanol. The product is purified in a separating funnel by repeatedly washing with diluted hydrochloric acid and subsequently with water and finally it is coagulated with an acetone-methanol mixture. After drying in a vacuum, one obtains 18.3 g. of a solid product, amorphous to X-rays, having the appearance of an unvulcanized elastomer and completely soluble in n-heptane. Under an infrared spectrographic examination the product shows a 44% propylene content, by weight. The spectrum also discloses the presence of tri-substituted double bonds (band at about 11.8 microns).

100 parts, by weight, of copolymer are mixed with 80 parts of carbon black ISAF, 55 parts of Flexon oil 766, 1 part of stearic acid, 5 parts of zinc oxide, 0.75 parts of mercaptobenzothiazole, 1.5 parts of tetramethylthiuram monosulfide and 1.5 parts of sulfur. The mixture is cured in a press at 150° C. and for varying periods. The properties of the vulcanizate are tabulated below:

| Time (in minutes) | 15 | 30 | 60 | 90 | 120 | 180 | 240 |
|---|---|---|---|---|---|---|---|
| Breaking load (kg./cm.$^2$) | 221 | 230 | 230 | 201 | 219 | 219 | 213 |
| Breaking elongation (percent) | 380 | 330 | 290 | 280 | 280 | 290 | 290 |
| Modulus at 200% (kg./cm.$^2$) | 79 | 102 | 117 | 122 | 127 | 128 | 121 |
| Residual deformation (percent) (Tension set) | 10 | 6 | 4 | 4 | 4 | 4 | 4 |

As this data indicates, the curing rate is high. 90% of the maximum modulus is in fact attained between 30 and 60 minutes of vulcanization.

EXAMPLE IV

The terpolymerization test of ethylene/propylene/3-ethylidenetricyclo[4.2.1.0$^{2.5}$]-non-7-ene, as described in the Example III, is repeated except one uses 1 cm.$^3$ of ethylidenetricyclo-non-ene and 0.3 millimol of diethyl zinc. We obtain 20 g. of a solid product, amorphous to X-rays, completely soluble in boiling n-heptane. The product contains 46.5%, by weight, of propylene by infrared spectrographic. The spectrum also shows the presence of tri-substituted double bonds (bond at about 11.8 microns). The ethylidenetricyclo-non-ene content (established by the reaction with iodine monochloride) is equivalent to 2% by weight. The copolymer is cured in the same mixture and in the same manner as described in Example III. The properties of the vulcanizate are reported in the following tabulation:

| Time (minutes) | 15 | 30 | 60 | 90 | 120 | 180 | 240 |
|---|---|---|---|---|---|---|---|
| Breaking load (kg./cm.$^2$) | 227 | 224 | 221 | 216 | 240 | 221 | 215 |
| Breaking elongation (percent) | 710 | 590 | 500 | 440 | 420 | 430 | 430 |
| Modulus at— | | | | | | | |
| 200% (kg./cm.$^2$) | 29 | 37 | 55 | 62 | 71 | 70 | 60 |
| 300% (kg./cm.$^2$) | 58 | 81 | 110 | 124 | 142 | 135 | 128 |
| Residual deformation (percent) | 26 | 18 | 12 | 8 | 8 | 8 | 8 |

As is obvious the 3-ethylidenetricyclo[4.2.1.0$^{2.5}$]-non-7-ene has utility in improved sulfur-vulcanizable elastomers of α-olefins. The resulting polymers find particular utility in automobile tires and in white or light colored ozone resistant compositions for use in molding rubber goods and the like.

What is claimed is:

1. 3-ethylidenetricyclo[4.2.1.0$^{2.5}$]-non-7-ene having the Formula I (I)

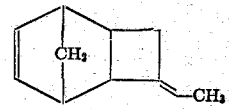

2. Process for the preparation of 3-ethylidenetricyclo[4.2.1.0$^{2.5}$]-non-7-ene by isomerizing 3 - vinyltricyclo[4.2.1.0$^{2.5}$]-non-7-ene with a catalyst selected from the group consisting of iron and cobalt carbonyls and compounds comprising the reaction product of a hydrocarbon soluble chelate or carbonyl of Fe or Co with a trialkylaluminum of the AlR$_3$ type whereby R is an alkyl group containing from 1 to 18 carbon atoms in a molar ratio of the compounds of Al and Fe or Co between 3:1 and 10:1.

References Cited
UNITED STATES PATENTS 3,661,869  5/1972  Greco et al.  260—666 Py
3,258,501  6/1966  Cannell  260—666 Py
3,265,749  8/1966  Cannell  260—666 Py DELBERT E. GANTZ, Primary Examiner V. O'KEEFE, Assistant Examiner U.S. Cl. X.R.

260—80.78